United States Patent
Fischer

(10) Patent No.: US 10,682,007 B2
(45) Date of Patent: Jun. 16, 2020

(54) MILK FOAMING DEVICE AND A MILK FOAMING METHOD

(71) Applicant: EUGSTER/FRISMAG AG, Amriswil (CH)

(72) Inventor: Daniel Fischer, Romanshorn (CH)

(73) Assignee: EUGSTER/FRISMAG AG, Amriswil (CH)

(*) Notice: Subject to any disclaimer, the term of this patent is extended or adjusted under 35 U.S.C. 154(b) by 332 days.

(21) Appl. No.: 15/744,151

(22) PCT Filed: Jan. 25, 2016

(86) PCT No.: PCT/EP2016/051422
§ 371 (c)(1),
(2) Date: Jan. 12, 2018

(87) PCT Pub. No.: WO2017/008919
PCT Pub. Date: Jan. 19, 2017

(65) Prior Publication Data
US 2018/0199753 A1    Jul. 19, 2018

(30) Foreign Application Priority Data

Jul. 14, 2015    (DE) .................. 10 2015 111 406

(51) Int. Cl.
*A47J 31/44*    (2006.01)
*A47J 43/07*    (2006.01)
(Continued)

(52) U.S. Cl.
CPC ....... *A47J 31/4485* (2013.01); *A47J 31/4489* (2013.01); *A47J 27/004* (2013.01); *A47J 43/0465* (2013.01); *A47J 43/0716* (2013.01)

(58) Field of Classification Search
CPC .... A47J 31/4485; A47J 31/4496; A47J 43/12; A47J 43/127; A47J 43/04;
(Continued)

(56) References Cited

U.S. PATENT DOCUMENTS 5,988,600 A * 11/1999 Vento ................. B01F 3/04531
                                                            261/121.2
6,912,972 B1 * 7/2005 Tsai .................... A01K 63/042
                                                            119/261

FOREIGN PATENT DOCUMENTS

DE          1143462 B    2/1963
DE     202011110158 U1  12/2012
(Continued)

OTHER PUBLICATIONS

German office action for Patent Application No. 10 2015 111 406.2 dated Nov. 13, 2015.
(Continued)

*Primary Examiner* — Matthew P Travers
(74) *Attorney, Agent, or Firm* — Bachman & LaPointe, PC

(57) ABSTRACT

Milk frothing apparatus (1) having a container (2) which delimits a supply space (3) for milk (4), and having a frothing element which can be rotated by electric motor with the function of frothing the milk (4) by way of rotation of the frothing element, the supply space being assigned a filling opening (22), wherein the frothing element is configured as a feed rotor (7), with the function of conveying, by way of the rotation of said feed rotor (7), the milk which was frothed by way of rotation of the frothing element (7) to an outlet (10) through a milk froth line (9) of the milk frothing apparatus (1), and wherein the feed rotor (7) is arranged at least in sections, preferably completely, in a frothing chamber (6) which is connected in a fluid-conducting manner to the supply space (3), from which frothing chamber (6) the
(Continued)

milk froth line (9) opens, and wherein the feed rotor (7) is assigned at least one airline (15, 15') for sucking in air by way of the rotation of the feed rotor (7), and wherein the air line (15, 15') opens into the frothing chamber (16) or the fluid-conducting connection (16) between the supply space (3) and the frothing chamber (6).

15 Claims, 1 Drawing Sheet

(51) Int. Cl.
*A47J 27/00* (2006.01)
*A47J 43/046* (2006.01)

(58) Field of Classification Search
CPC ....... A47J 43/046–0465; A47J 43/0716–0722; A47J 43/085; B01F 3/04453; B01F 3/04531; B01F 3/04539; B01F 2003/0456; B01F 3/04787; B01F 7/00241; B01F 7/00291; B01F 7/00341; B01F 13/02
See application file for complete search history.

(56) References Cited

FOREIGN PATENT DOCUMENTS

| | | |
|---|---|---|
| EP | 1472963 A1 | 11/2004 |
| EP | 1827188 A1 | 9/2007 |
| EP | 2198762 A1 | 6/2010 |
| EP | 2229853 A1 | 9/2010 |
| EP | 2397219 A2 | 12/2011 |
| EP | 2408341 A1 | 1/2012 |
| WO | 2012049597 A1 | 4/2012 |

OTHER PUBLICATIONS

International search report for patent application No. PCT/EP2016/051422 dated Apr. 26, 2016.

* cited by examiner

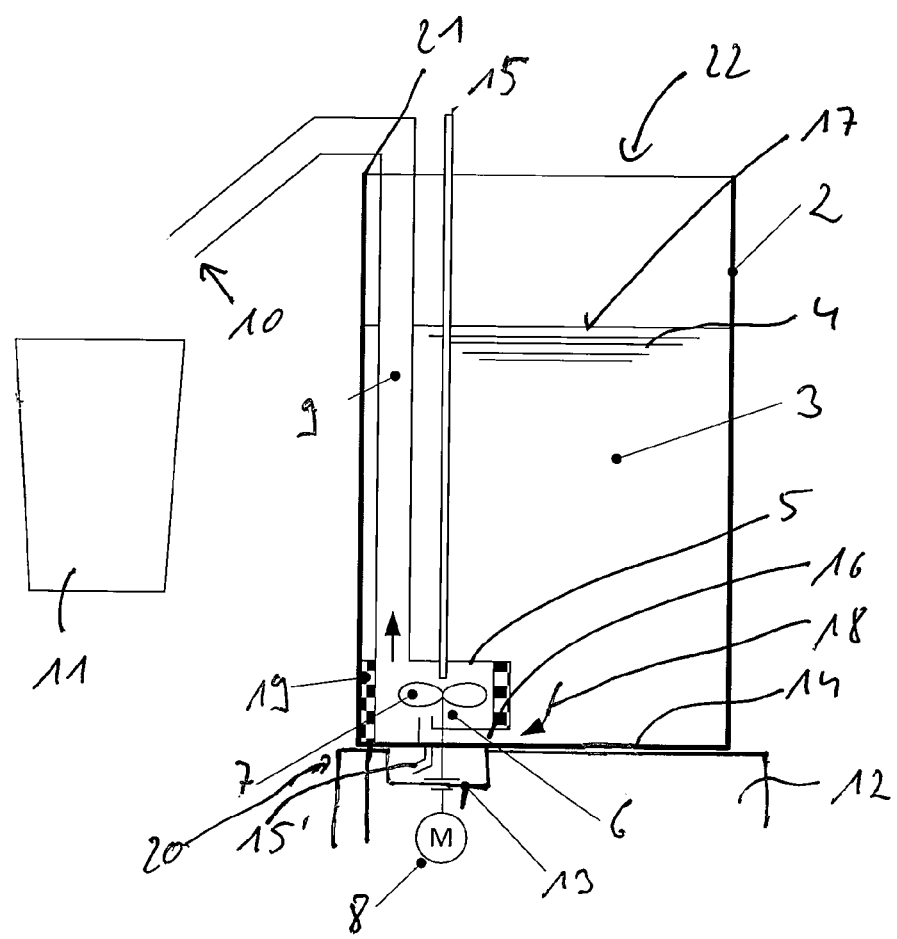

MILK FOAMING DEVICE AND A MILK FOAMING METHOD

BACKGROUND OF THE INVENTION

The invention relates to a milk frothing apparatus, having a container which delimits a supply space for milk, and having a frothing element which can be rotated by electric motor for frothing the milk, the supply space being assigned a (preferably upper) filling opening for filling milk (preferably manually). Furthermore, the invention relates to a frothing method for frothing milk, in particular by way of a milk frothing apparatus according to the invention.

EP 1 827 188 B1 has disclosed a milk frothing apparatus which has a container which is open at the top and delimits a supply space for milk, a frothing element which is configured as a whisk being arranged directly in the supply space, by way of which frothing element the milk can be frothed. Via a magnetic coupling, the frothing element is driven via an electric motor which is arranged in a station which is separate from the container. It is a disadvantage in the case of the known container that the container has to be tipped over for emptying into a cup, by the entire container being handled or tipped. Moreover, the milk froth quality appears worthy of improvement.

For further prior art reference is made to EP 2 408 341 B1, EP 2 198 762 A1 and DE 11 43 462 A.

SUMMARY OF THE INVENTION

Proceeding from the abovementioned prior art, the invention is based on the object of specifying a comfortable manageable milk frothing apparatus, by way of which filling of milk froth into a drinking vessel is possible without tipping of the entire container. The milk frothing apparatus is preferably to be distinguished by an improved milk froth quality.

Furthermore, the object consists in specifying a correspondingly improved milk frothing method which no longer makes tipping of a milk container necessary for filling milk froth which is produced into a drinking vessel.

With regard to the milk frothing apparatus, the said object is achieved by way of the features disclosed herein, that is to say in the case of a milk frothing apparatus of the generic type by virtue of the fact that the frothing element is configured as a feed rotor, by way of which milk which is frothed by way of the rotation of the feed rotor can be conveyed to an outlet (towards a drinking vessel) through a milk froth line of the milk frothing apparatus, which milk froth line is preferably configured as a riser.

With regard to the frothing method, the object is achieved by way of the features disclosed herein, that is to say in the case of a method of the generic type by virtue of the fact that the milk (to be frothed) is filled into a supply space which is delimited by a container, and the said milk is frothed by way of rotation of a frothing element which is configured as a feed rotor, and the milk froth which is produced is conveyed to an outlet (towards a drinking vessel) by way of the rotation of the feed rotor through a milk froth line which is preferably configured as a riser.

Advantageous developments of the invention are specified in the subclaims. All combinations comprising at least two features which are disclosed in the description, the claims and/or the figures fall within the scope of the invention. In order to avoid repetitions, features which are disclosed in accordance with the apparatus are also to be considered to be disclosed and to be capable of being claimed in accordance with the method. Features which are disclosed in accordance with the method are likewise also to be considered to be disclosed and to be capable of being claimed in accordance with the apparatus.

The invention is based on the concept of imparting a double function to the frothing element, by the frothing element, by way of its rotation, not only frothing milk from the supply space of the container, but rather at the same time conveying the frothed milk, that is to say the milk froth, to an outlet in the direction of a drinking vessel through a milk froth line (feed line) of the milk frothing apparatus, which milk froth line is preferably configured as a riser. In other words, not only is milk frothed by way of the frothing element, but rather the frothed milk is conveyed through a milk froth line which is preferably configured as a riser, so that tilting of the container for filling a drinking vessel with milk froth is not necessary as a result. In the case of a milk frothing apparatus according to the invention, the frothing element which is configured as a feed rotor therefore has the function of an impeller wheel of a milk pump, by way of the rotation of which firstly the milk is frothed and secondly the milk froth is conveyed through a milk froth line to an outlet, with the result that the functions of frothing and milk conveying are assumed by one and the same element, namely the frothing element which is configured as a feed rotor. The feed rotor is preferably rotated about a rotational axis at a rotational speed from a value range between 500 rpm and 8000 rpm, very particularly preferably between 1500 rpm and 4000 rpm, in order to optimize firstly the frothing behaviour and secondly the delivery capacity. It has proven particularly expedient if the feed rotor has a diameter from a value range between 10 mm and 35 mm, preferably between 18 mm and 25 mm. The delivery capacity of the feed rotor in relation to milk froth is preferably between 0.1 l/min and 0.8 l/min.

It has proven particularly expedient if the feed rotor is configured as an impeller wheel, as are used in the case of impeller wheel pumps, in particular axial or radial pumps. To this end, the impeller wheel preferably comprises a plurality of blades which are adjacent in the circumferential direction for frothing and accelerating the milk or the milk froth into the milk froth line.

In order to optimize the milk froth quality, it is advantageously provided in one development of the invention that the feed rotor is assigned at least one air line for sucking in air, in particular by way of the rotation of the feed rotor, preferably exclusively by way of the said rotation. As will still be explained later, the air line preferably opens into a frothing chamber which encloses the feed rotor at least in sections or into a fluid connection between the frothing chamber and the supply space which is delimited by the container and has a greater volume than the frothing chamber. With regard to the arrangement of the air line, there are different possibilities. It is thus conceivable, for example, to route the air line upwards, starting from a surrounding region of the feed rotor, in particular in a region of a container edge or above the latter, at any rate preferably in a region above a maximum or permissible milk filling level in the supply space which is delimited by the container, in order thus to ensure an entry of air (and preferably no entry of milk). In addition or as an alternative, an air line can also be routed downwards to a container underside and/or can be arranged there. It is also conceivable in addition or as an alternative to route an air line outwards in the radial direction, in particular to arrange it in a circumferential wall of the container or to penetrate the circumferential wall. For the case of the lateral or radial opening of the air line outwards or the opening of the air line downwards out of the container, said air line can be assigned an automatically switching check valve in one development of the invention, which check valve opens during rotation of the feed rotor in order to suck in air and closes the air line in the case of a decreasing rotational speed or a feed rotor which is switched off, in order to prevent an exit of milk outwards out of the air line.

It has proven particularly expedient if the feed rotor is arranged at least in sections, preferably completely, in a frothing chamber which is connected to the supply space in a fluid-conducting manner, in particular is arranged in the container at a spacing from a container upper side, and out of which the milk froth line opens. By way of the arrangement of the feed rotor in a frothing chamber which is delimited structurally with respect to the supply space, the milk froth quality can be increased and the conveying property of the feed rotor can be improved; the latter, in particular, on account of the additional utilization of the volumetric increase of the milk froth compared with the milk to convey the milk froth through the feed line. In other words, by way of the provision of a frothing chamber which receives the feed rotor at least in sections, preferably completely, the froth or its volumetric increase can be channelled in an improved manner and therefore contributes, in addition to the rotational movement of the feed rotor, to the conveying of the milk froth in the direction of the drinking vessel via the milk froth line which is preferably configured as a riser. It is preferred here if the milk froth line opens from an otherwise preferably closed upper side of the frothing chamber.

It is particularly expedient if the frothing chamber can be supplied with milk from the supply space by way of rotation of the feed rotor, which can be realised by virtue of the fact that the frothing chamber is connected to the supply space by way of a fluid-conducting connection which acts as a suction line or suction channel. The said fluid-conducting connection preferably opens into the frothing chamber from below, at any rate from below a milk froth line inlet, preferably below the feed rotor.

With regard to the specific realisation of the frothing chamber, it is advantageous if the frothing chamber is delimited by a housing which is arranged in the container and, in particular, in a lower container region and separates the frothing chamber volume from the supply space volume, the housing interior space, that is to say the frothing chamber and the supply space being connected to one another via the abovementioned fluid-conducting connection.

It is particularly expedient if the combination of the abovementioned housing of the frothing chamber and the feed rotor which is arranged therein form an axial pump or a radial pump, that is to say a pump which conveys the milk froth in the radial direction towards the outside and then preferably in the axial direction towards the top or directly in the axial direction towards the top in the direction of the outlet of the milk froth line.

As has been mentioned, it is particularly expedient if the frothing chamber is arranged in a lower region of the container and/or can be supplied from an underside with milk out of the supply space via the fluid-conducting connection, it being particularly preferred if the inlet of the fluid-conducting connection into the frothing chamber is spaced apart from an inlet opening into the milk froth line via the feed rotor.

As has already likewise been indicated, it is particularly expedient if the air line opens into the frothing chamber for feeding air to the frothing process and/or opens into the fluid-conducting connection between the supply space and the frothing chamber. As a result, the air can be fed to the frothing chamber in a targeted manner.

One embodiment of the milk frothing apparatus is particularly advantageous, in which the said milk frothing apparatus has heating means for heating the milk in order to produce warm or hot milk froth. It is particularly expedient here if the heating means are assigned directly to the frothing chamber, with the result that the milk which is present in the frothing chamber is at least primarily heated, and the milk which is situated in the supply space is heated only indirectly or to a less pronounced extent. This can be realised, for example, by virtue of the fact that the heating means are arranged in the frothing chamber and/or enclose the said frothing chamber at least in sections. In addition or as an alternative, it is possible that the heating means are integrated into the abovementioned housing of the frothing chamber or are enclosed radially on the outside by the housing of the frothing chamber, it also fundamentally being possible to assign the heating means to the supply space.

There are different possibilities with regard to the specific configuration of the heating means. The heating means can have, for example, an inductive heating element or can be configured as a microwave heating means. The configuration of the heating means as a resistance heater is also possible. In addition or as an alternative, the heating means can be configured so as to heat the milk by way of steam, the heating means comprising a steam generator in this case, which steam generator can be arranged in the container itself but is preferably arranged in an optional station which is still to be described later and onto which the container can be docked releasably, and, in particular, in order to drive the feed rotor.

It is particularly expedient if the milk frothing apparatus is configured in multiple pieces or has at least two functional parts, namely the abovementioned container with the frothing element and the milk froth line, and a station (docking station), and/or on which the container can be placed, the station comprising the electric motor drive for rotationally driving the feed rotor, it being possible for the torque to be transmitted between the electric motor and the feed rotor by means of a coupling, the driven coupling part being arranged in the station and the output coupling part being arranged on the container. Here, the coupling is preferably configured as a magnetic coupling, that is to say as a coupling which operates in a contactless manner. By way of placing of the container on or at the station, a connection of the coupling parts for the transmission of torque preferably takes place automatically. It is particularly preferred if, in addition to the electric-motor drive for the feed rotor, the station also has an electric connector for supplying the heating means with electric energy and/or a steam connector and steam generating means for supplying the heating means with energy when the container is arranged on or at the station.

As has already been indicated, it is particularly expedient if the milk froth line is configured as a riser, that is to say extends in the vertical direction of the container starting from an inlet opening, it being particularly expedient if the feed line extends over at least 50%, further preferably over at least 75% of the vertical extent of the container and/or of the supply space which is delimited by the said container. The riser preferably penetrates the filling opening or is guided laterally past the latter in an upward direction.

The invention also relates to a method for frothing milk, the milk to be frothed first of all being filled into a supply space which is delimited by a container, and the milk being frothed by way of rotation of a frothing element which is configured as a feed rotor, and the milk froth which is produced being conveyed to an outlet by way of the rotation of the feed rotor through a milk froth line which is preferably configured as a riser.

It is particularly preferred if the milk is heated before and/or during the frothing operation, in particular from a temperature from a value range between 40° C. and 80° C., preferably between 55° C. and 70° C.

As an alternative, it is also possible to process cold milk by way of the milk frothing apparatus according to the invention, in particular to froth it by way of the feed rotor and to convey it to the outlet by way of the said feed rotor. To this end, it is possible to switch off any existing heating means or to operate them at low power or to configure the milk frothing apparatus so as to be free from heating means from the outset.

BRIEF DESCRIPTION OF THE DRAWINGS

Further advantages, features and details of the invention result from the following description of one preferred exemplary embodiment and using the drawings.

In the single FIG. 1, the said drawings show a diagrammatic illustration of one preferred embodiment of a milk frothing apparatus according to the invention.

DETAILED DESCRIPTION

FIG. 1 shows a milk frothing apparatus 1. The said milk frothing apparatus 1 comprises a container 2 which, in its interior, delimits a supply space 3 for milk 4 to be frothed, into which supply space 3 milk can be filled manually through an upper, open filling opening 22.

A frothing element which is configured as a feed rotor 7, as an impeller wheel in the specific exemplary embodiment, and can be driven by means of an electric motor 8 is arranged in a lower region of the container 2 within a frothing chamber 6 which is delimited by a housing 5. By way of the rotation of the feed rotor 7 about its rotational axis, milk is frothed within the frothing chamber 6, and is conveyed towards an outlet 10 through a milk froth line 9 which is configured as a riser, opens out of the frothing chamber 6 and rises upwards in the vertical direction, and the said milk passes through the said outlet 10 into a drinking vessel 11 which is positioned below the outlet 10.

It can be seen from FIG. 1 that the electric motor 8 is not situated within the container 2, which can also fundamentally be realised in an alternative manner. The electric motor 8 is preferably situated in a station 12 (docking station) which is separate from the container and on which the container 2 can be placed. The torque transmission from the electric motor 8 to the feed rotor 7 takes place via a coupling 13 which operates in a contactless manner, a magnetic coupling here, the coupling part (primary side) of which, which is driven by electric motor, is arranged in the station 12 and the output coupling part of which is arranged on the secondary side on the container side.

It can be seen from FIG. 1 that, as mentioned, the frothing chamber 6 is arranged in a lower region of the container 2, that is to say in the vicinity of a floor 14 of the container 2, and can be supplied with air via an air line 15, 15', it being possible for the air to be sucked in by way of the rotation of the frothing element 7. In the exemplary embodiment, two air lines 15, 15' are illustrated merely for purposes of clarification, a single air line 15 or 15' being sufficient. The illustration serves merely to explain that the air line 15 or 15' can be introduced from different directions. The air line which is denoted by the reference numeral 15' does not open directly into the frothing chamber 6, which is possible in an alternative manner, but rather into a fluid-conducting connection 16, via which milk can flow out of the supply space 3 into the frothing chamber 6 or can be sucked in by way of rotation of the feed rotor 7. The said air line 15' is preferably provided with a check valve for preventing an exit of milk. A check valve of this type can fundamentally also be used in the case of the air line 15, but is not absolutely necessary here, since the air line 15 is routed out above a maximum filling level 17 of milk, with the result that there is not the risk of milk being sucked in or of air not being sucked in.

It can be seen, furthermore, that the fluid-conducting connection 16 is routed from the bottom into the frothing chamber 6, in order to obtain as far as possible no residual quantities or only low residual quantities or milk quantities which cannot be frothed. Therefore, indicated by way of the arrow 18, the milk 4 flows along an underside of the frothing chamber 6 and from below into the said frothing chamber 6, is then frothed by the rotating feed rotor 7 with simultaneous sucking in of air, and is conveyed upwards in the direction of the drinking vessel 11 through the milk froth line 9 by way of the rotational movement of the feed rotor 7 in combination with the volumetric increase which results from the frothing operation.

Furthermore, it arises from FIG. 1 that the frothing chamber 6 is assigned electric heating means 19 here by way of example, which heating means 19 heat the milk 4 and the milk froth within the frothing chamber 6. The heating means 19 are supplied with energy by the station 12, for example via an electric interface 20 here, when the container 2 is situated on the station 12.

The combination of the housing 5, or of the frothing chamber 6 which is delimited by the said housing 5, and the feed rotor 7 forms a pump, more precisely a vane cell pump, which sucks in milk 4, here by way of example from below from the axial direction, and conveys the milk froth which is produced in the axial direction. The milk frothing apparatus 1 according to the invention does not require additional conveying or frothing means. Emptying of the container 2 is possible without moving the latter, since the milk froth is conveyed through the milk froth line 9 which (this is preferred) is routed outwards in the radial direction via an upper edge 21 of the container 2.

LIST OF REFERENCE NUMERALS

1 Milk frothing apparatus
2 Container
3 Supply space
4 Milk
5 Housing
6 Frothing chamber
7 Feed rotor
8 Electric motor
9 Milk froth line
10 Outlet
11 Drinking vessel
12 Station (docking station)
13 Coupling
14 Floor
15 Air line
15' Air line
16 Fluid-conducting connection
17 Maximum milk filling level
18 Arrow (milk flow)
19 Heating means 20 Electric interface
21 Upper container edge
22 Filling opening
FIG. 1

The invention claimed is:

1. Milk frothing apparatus (1) having a container (2) which delimits a supply space (3) for milk (4), and having a frothing element which can be rotated by an electric motor with the function of frothing the milk (4) by way of rotation of the frothing element, the supply space being assigned a filling opening (22), wherein the frothing element is configured as a feed rotor (7), with the function of conveying, by way of the rotation of said feed rotor (7), the milk which was frothed by way of rotation of the frothing element (7) to an outlet (10) through a milk froth line (9) of the milk frothing apparatus (1), and wherein the feed rotor (7) is arranged at least in sections in a frothing chamber (6) which is connected in a fluid-conducting manner to the supply space (3), from which frothing chamber (6) the milk froth line (9) opens, and wherein the feed rotor (7) is assigned at least one airline (15, 15') for sucking in air by way of the rotation of the feed rotor (7), and wherein the air line (15, 15') opens into the frothing chamber (6) or a fluid-conducting connection (16) between the supply space (3) and the frothing chamber (6), and wherein the milk frothing apparatus (1) comprises a station (12) which has an electric-motor drive motor, and on which station (12) the container (2) with the feed rotor (7) can be placed releasably, and further comprising coupling means comprising a magnetic coupling for transmitting a drive torque from the electric motor (8) to the feed rotor (7).

2. Milk frothing apparatus according to claim 1, wherein the feed rotor (7) is configured as an impeller wheel comprising a plurality of blades which are adjacent in the circumferential direction.

3. Milk frothing apparatus according to claim 1, wherein the frothing chamber (6) is arranged in the container (2).

4. Milk frothing apparatus according to claim 3, wherein the frothing chamber (6) is connected to the supply space in a fluid-conducting manner in such a way that milk (4) can be sucked out of the supply space (3) into the frothing chamber (6) by way of rotation of the feed rotor (7).

5. Milk frothing apparatus according to claim 1, wherein the frothing chamber (6) is separated from the supply space (3) by a housing (5) which is arranged in the container (2).

6. Milk frothing apparatus according to claim 5, wherein the housing (5) and the feed rotor (7) form an axial pump or a radial pump.

7. Milk frothing apparatus according to claim 1, wherein the frothing chamber (6) is arranged in a lower region of the container (2) and/or can be supplied from an underside with milk (4) out of the supply space (3) via the fluid-conducting connection (16).

8. Milk frothing apparatus according to claim 1, further comprising heating means (19) for heating the milk (4), the heating means (19) being assigned to the frothing chamber (6) by being arranged in the frothing chamber (6) and/or enclosing the said frothing chamber (6) at least in sections and/or being integrated into a housing (5) of the frothing chamber (6) or being enclosed by the housing (5) of the frothing chamber (6).

9. Milk frothing apparatus according to claim 1, wherein the station (12) has an electric connector for supplying a heating means (19) with electric energy and/or a steam connector for supplying the heating means (19) with steam when the container (2) is placed on and/or at the station.

10. Milk frothing apparatus according to claim 1, wherein the milk froth line extends in the direction of a vertical extent of the container (2), and/or of the supply space (3) which is delimited by the container (2).

11. Milk frothing apparatus according to claim 10, wherein the milk froth line extends over at least 50% of the vertical extent of the container and/or of the supply space (3) which is delimited by the said container (2).

12. Milk frothing apparatus according to claim 10, wherein the milk froth line extends over at least 75% of the vertical extent of the container and/or of the supply space (3) which is delimited by the said container (2).

13. Milk frothing apparatus according to claim 1, wherein the milk froth line (9) is configured as a riser.

14. Milk frothing apparatus according to claim 1, wherein the feed rotor (7) is arranged completely in the frothing chamber (6).

15. Method for frothing milk (4) by way of a milk frothing apparatus (1) according to claim 1, wherein milk (4) is filled into the supply space (3) which is delimited by the container (2), and the milk (4) is frothed by way of rotation of the frothing element which is configured as a feed rotor (7) in the frothing chamber accommodating the feed rotor (7) at least in sections, and the milk froth which is produced is conveyed by way of the rotation of the feed rotor (7) to the outlet (10) through the milk froth line (9).

* * * * *